US012568557B2

(12) United States Patent
Kim et al.

(10) Patent No.: US 12,568,557 B2
(45) Date of Patent: Mar. 3, 2026

(54) INDUCTION HEATING DEVICE AND METHOD OF CONTROLLING THE SAME

(71) Applicant: LG ELECTRONICS INC., Seoul (KR)

(72) Inventors: Gwang Rok Kim, Seoul (KR); Wongyu Park, Seoul (KR); Bada Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 980 days.

(21) Appl. No.: 17/271,863

(22) PCT Filed: Aug. 30, 2019

(86) PCT No.: PCT/KR2019/011172
§ 371 (c)(1),
(2) Date: Feb. 26, 2021

(87) PCT Pub. No.: WO2020/046052
PCT Pub. Date: Mar. 5, 2020

(65) Prior Publication Data
US 2021/0204368 A1 Jul. 1, 2021

Related U.S. Application Data

(60) Provisional application No. 62/724,733, filed on Aug. 30, 2018.

(51) Int. Cl.
*H05B 6/06* (2006.01)
*H05B 6/08* (2006.01)
*H05B 6/12* (2006.01)

(52) U.S. Cl.
CPC ............. *H05B 6/065* (2013.01); *H05B 6/062* (2013.01); *H05B 6/08* (2013.01); *H05B 6/1209* (2013.01); *H05B 2213/05* (2013.01)

(58) Field of Classification Search
CPC .......... H05B 6/065; H05B 6/062; H05B 6/08; H05B 6/1209; H05B 2213/05
See application file for complete search history.

(56) References Cited

U.S. PATENT DOCUMENTS 9,307,580 B2 * 4/2016 Lee ........................ H05B 6/062
9,554,425 B2 * 1/2017 Sawada ................. H02M 5/458
(Continued)

FOREIGN PATENT DOCUMENTS

JP 2011103225 A * 5/2011
JP 2016-004747 1/2016
(Continued)

OTHER PUBLICATIONS

English machine translation of JP-2011103225-A (Year: 2011).*
(Continued)

*Primary Examiner* — Steven W Crabb
*Assistant Examiner* — Fahmida Ferdousi
(74) *Attorney, Agent, or Firm* — KED & ASSOCIATES, LLP

(57) ABSTRACT

The disclosure relates to an induction heating device and a method of controlling the induction heating device. The induction heating device includes a first working coil and a second working coil. According to an embodiment of the disclosure, a driving start time of the first working coil and a driving start time of the second working coil are determined based on a driving scheme of the first working coil, a driving scheme of the second working coil, and a predetermined driving period. According to an embodiment of the disclosure, an eccentricity determination period of the first working coil and an eccentricity determination period of the second working coil are determined based on the driving scheme of the first working coil, the driving scheme of the second working coil, the driving period, a duty cycle of the
(Continued)

first working coil, and a duty cycle of the second working coil.

12 Claims, 13 Drawing Sheets

(56) References Cited

U.S. PATENT DOCUMENTS

| | | | | |
|---|---|---|---|---|
| 10,004,114 | B2 * | 6/2018 | Lee | H05B 6/065 |
| 2011/0192835 | A1 | 8/2011 | Lee et al. | |
| 2012/0248096 | A1 | 10/2012 | Lee et al. | |
| 2015/0245418 | A1 | 8/2015 | Lee et al. | |
| 2016/0381736 | A1 | 12/2016 | Christiansen et al. | |
| 2021/0204368 | A1 * | 7/2021 | Kim | H05B 6/065 |

FOREIGN PATENT DOCUMENTS

| | | |
|---|---|---|
| JP | 2017-201638 | 11/2017 |
| KR | 10-2011-0092891 | 8/2011 |
| KR | 10-2016-0139381 | 12/2016 |
| KR | 10-1835714 | 3/2018 |

OTHER PUBLICATIONS

International Search Report and Written Opinion dated Dec. 12, 2019 issued in Application No. PCT/KR2019/011172.
Korean Office Action dated May 21, 2024 issued in Application No. 10-2021-7006210.

* cited by examiner

【Figure 1】
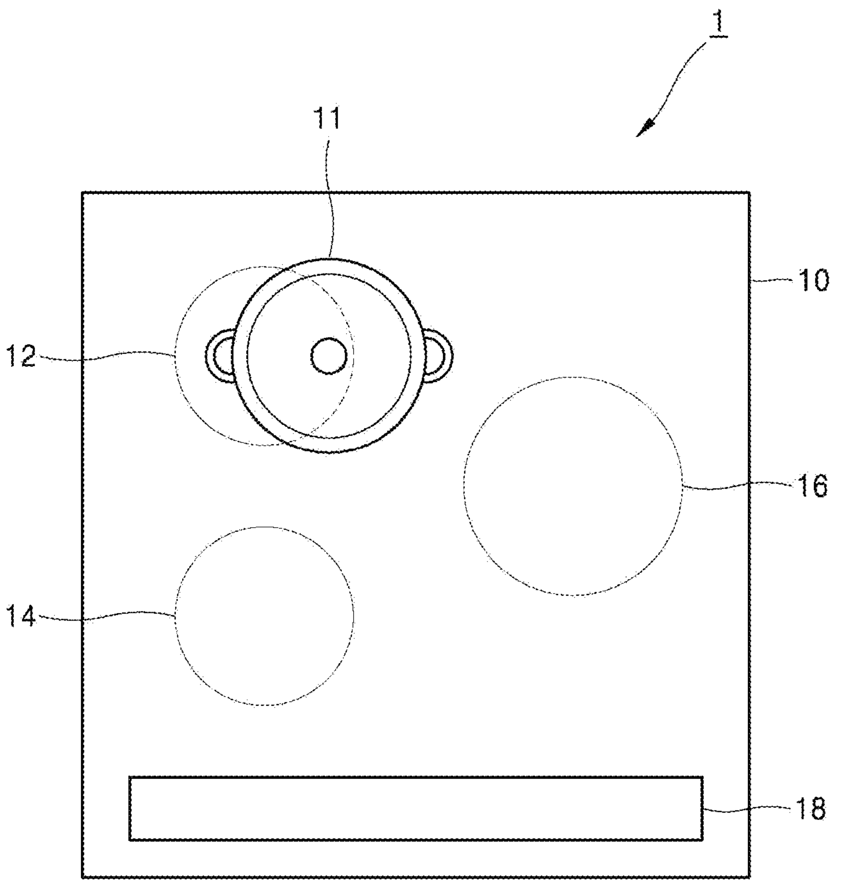
-- Prior Art --

【Figure 2】
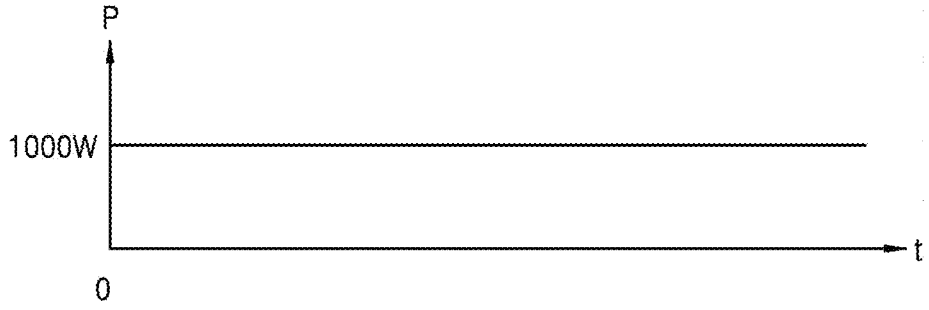
-- Prior Art --
【Figure 3】
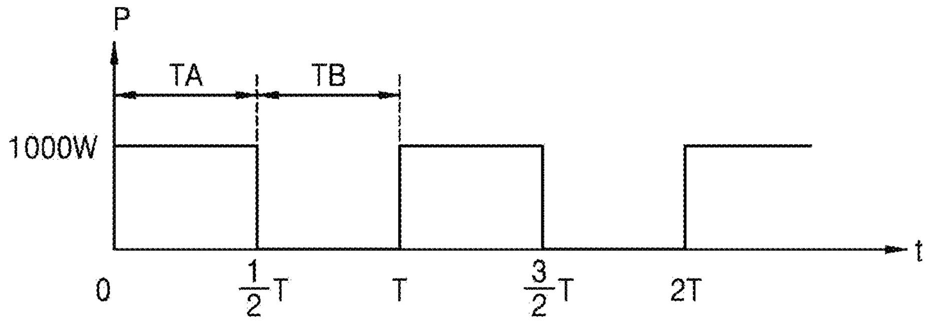
-- Prior Art --

【Figure 4】
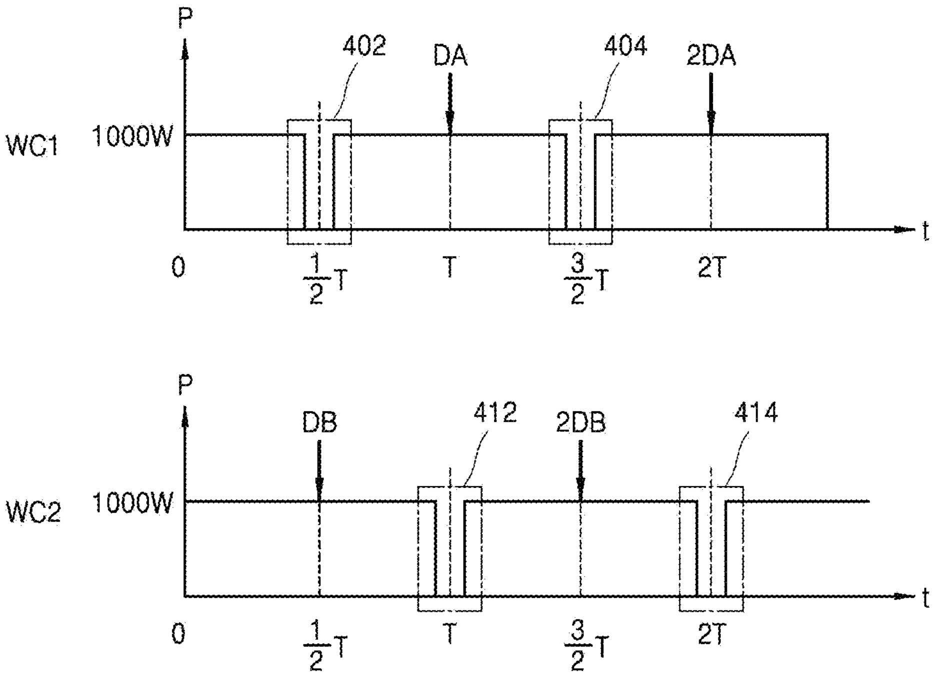
-- Prior Art --
【Figure 5】
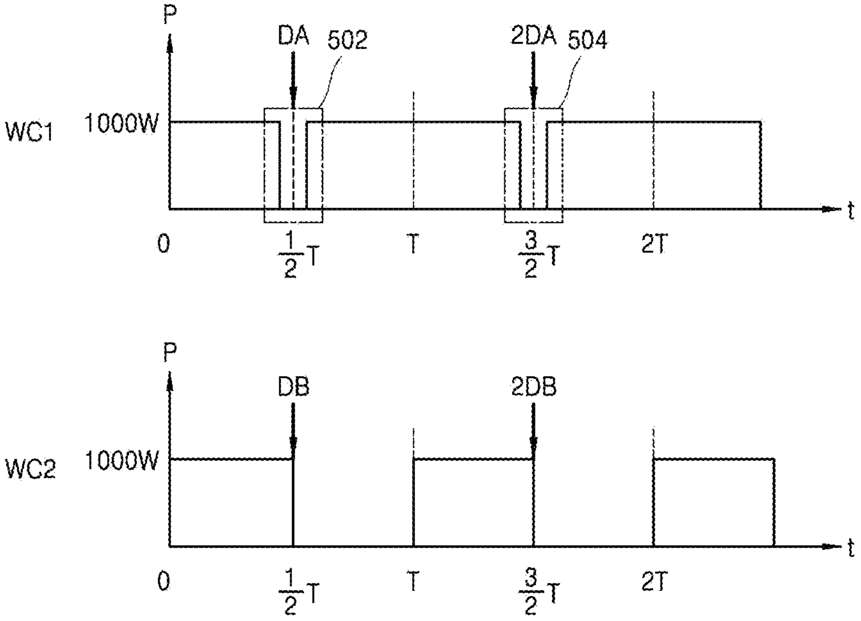
-- Prior Art --

【Figure 6】
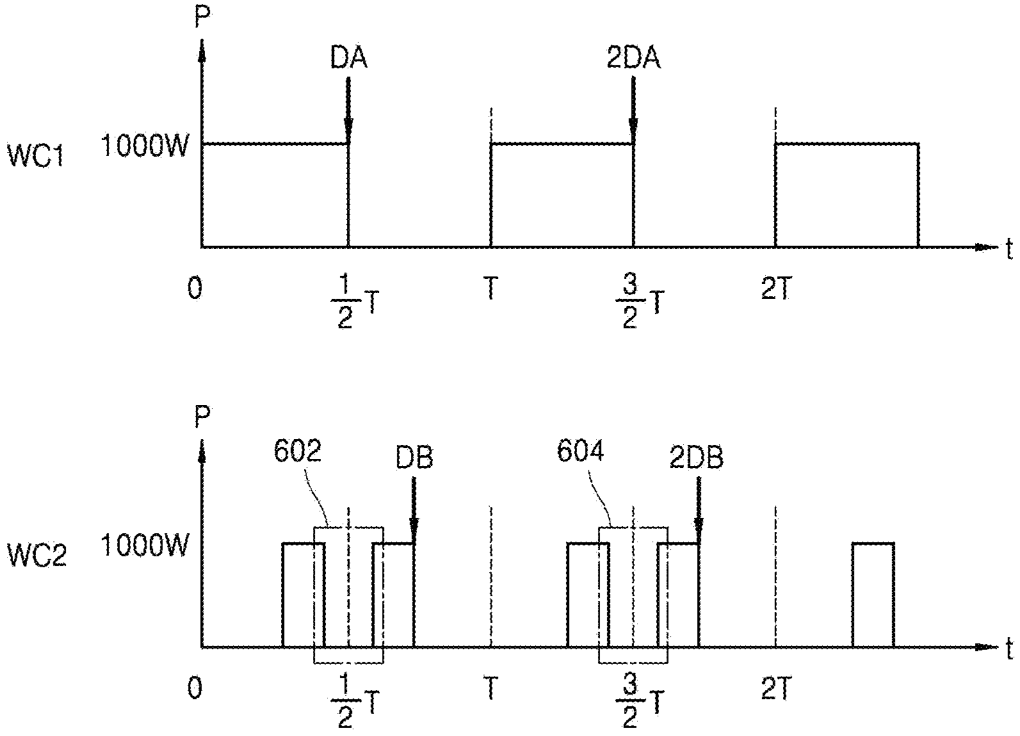
-- Prior Art --

[Fig. 7]
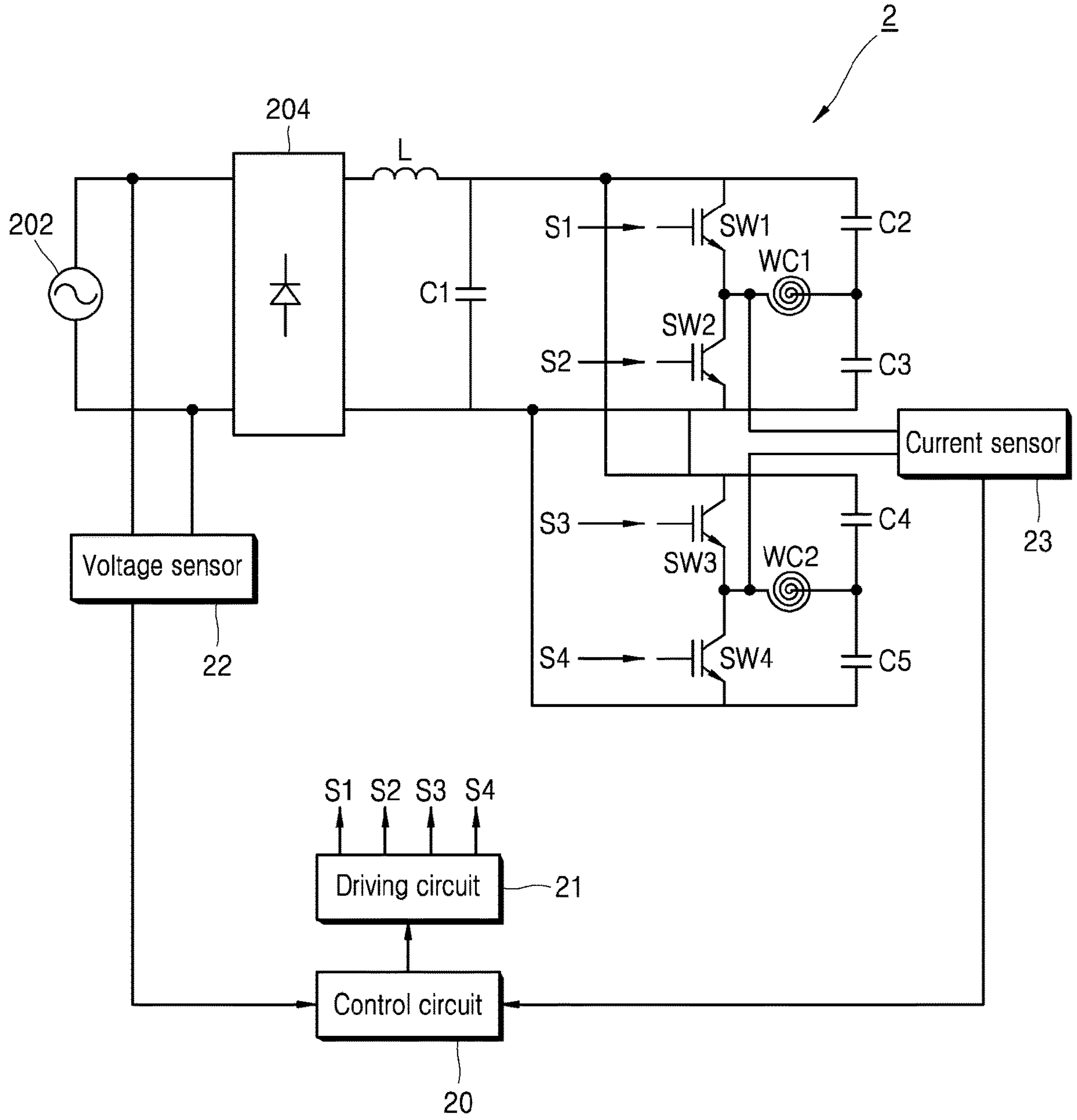

[Fig. 8]
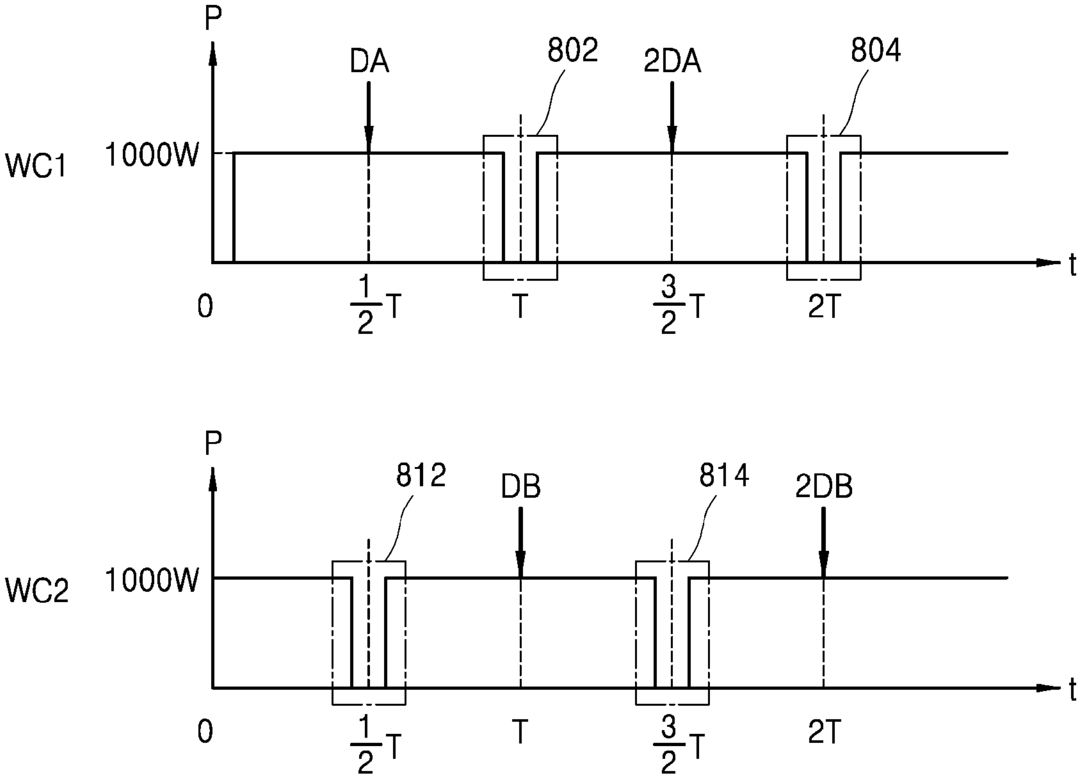
[Fig. 9]
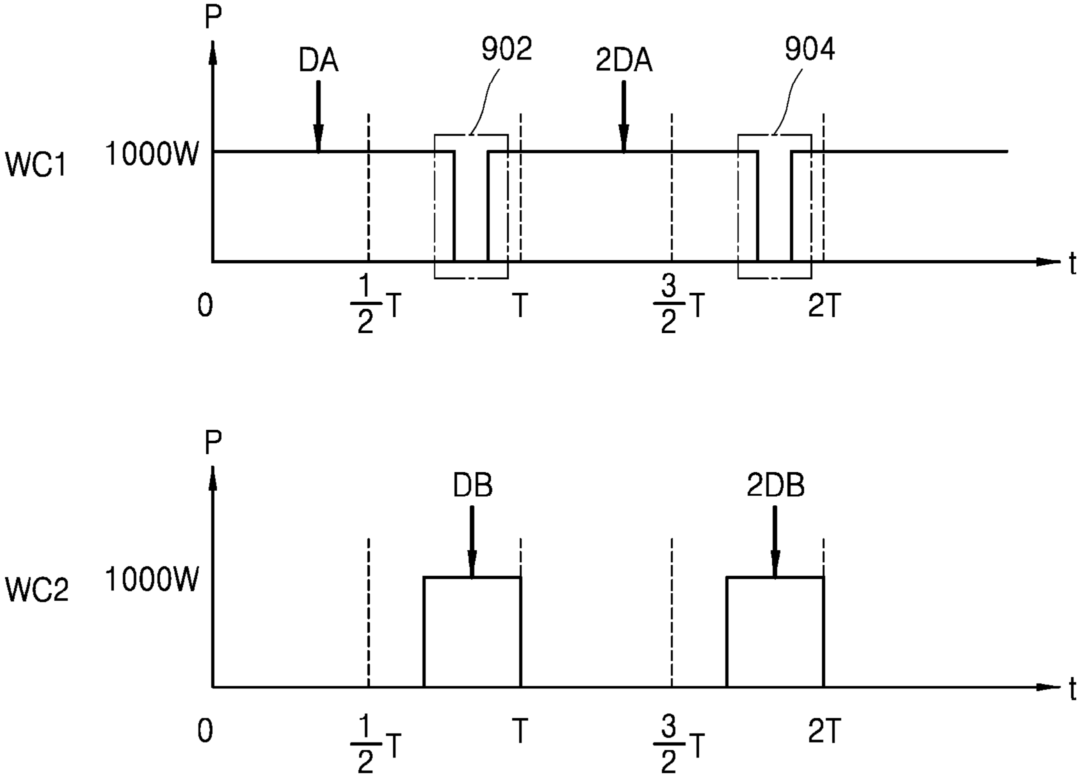

[Fig. 10]
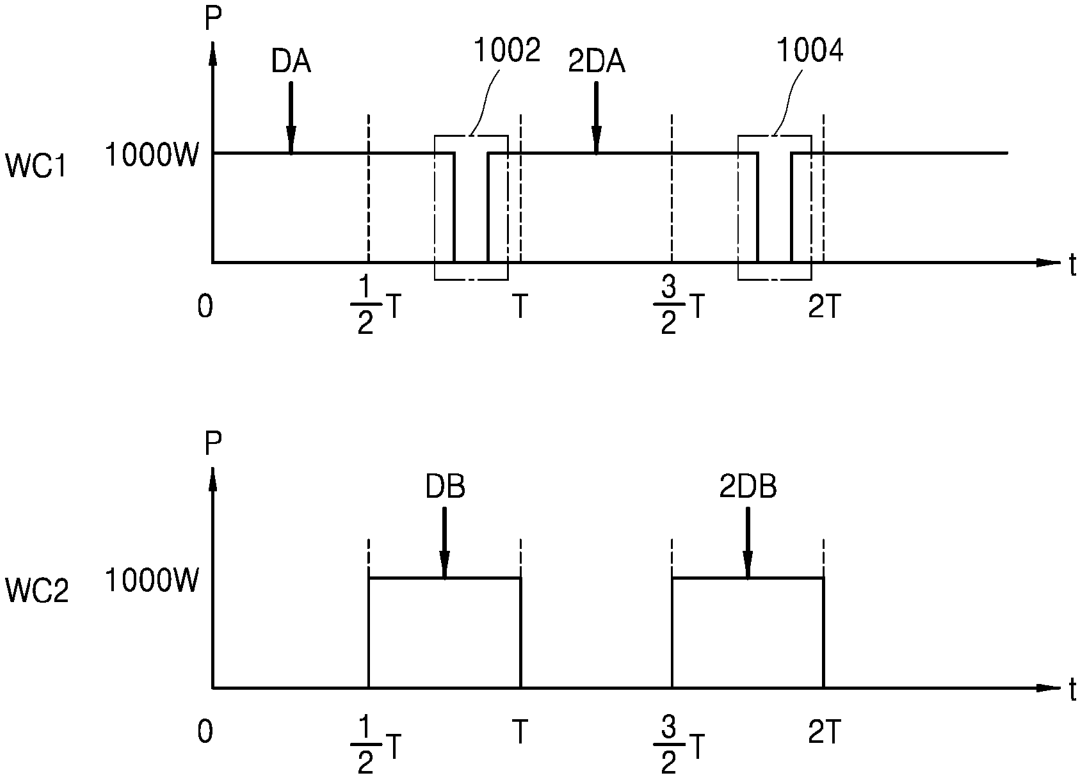
[Fig. 11]
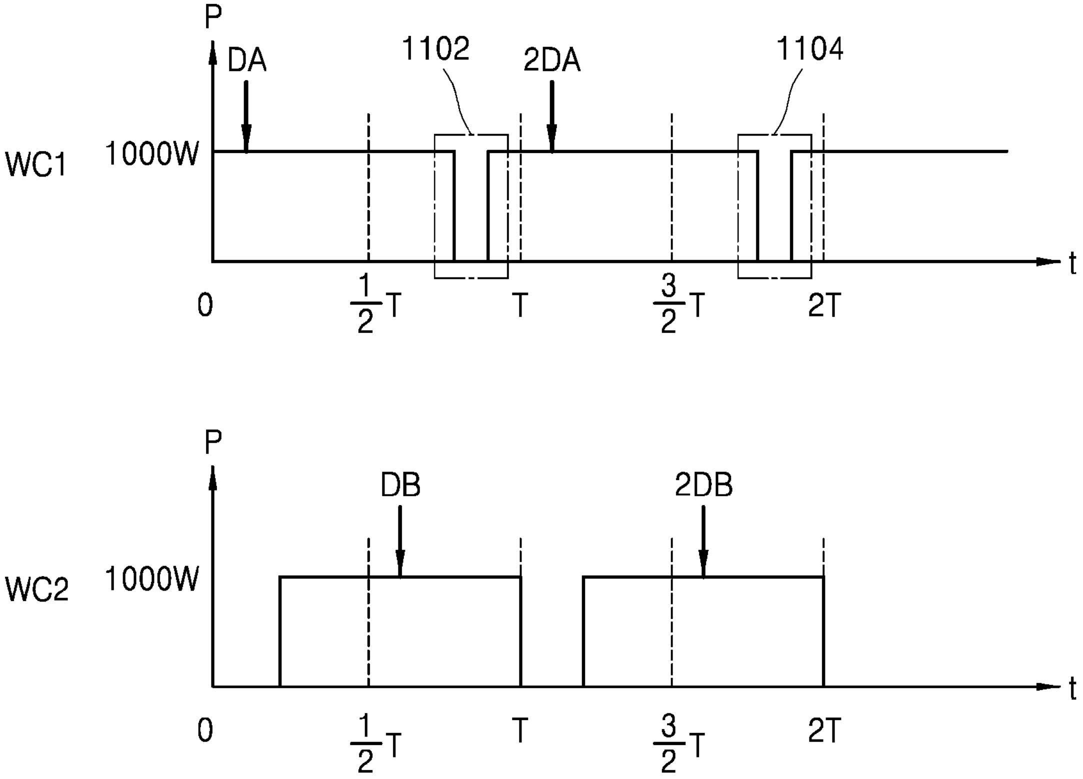

[Fig. 12]
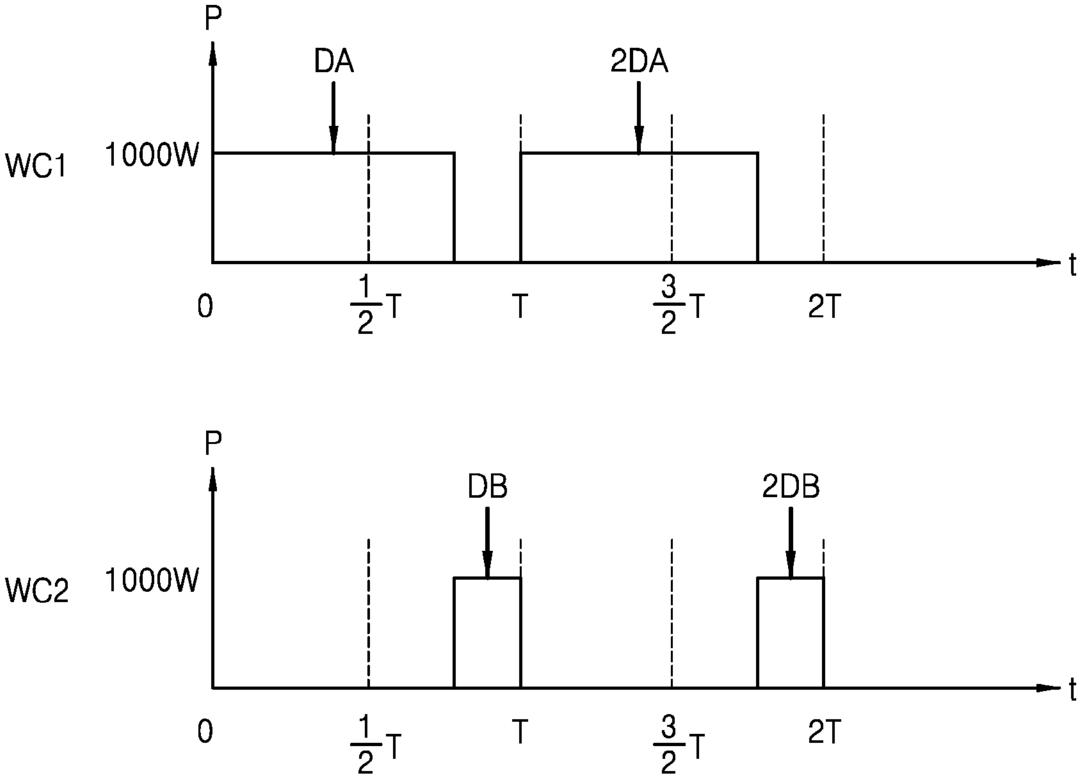
[Fig. 13]
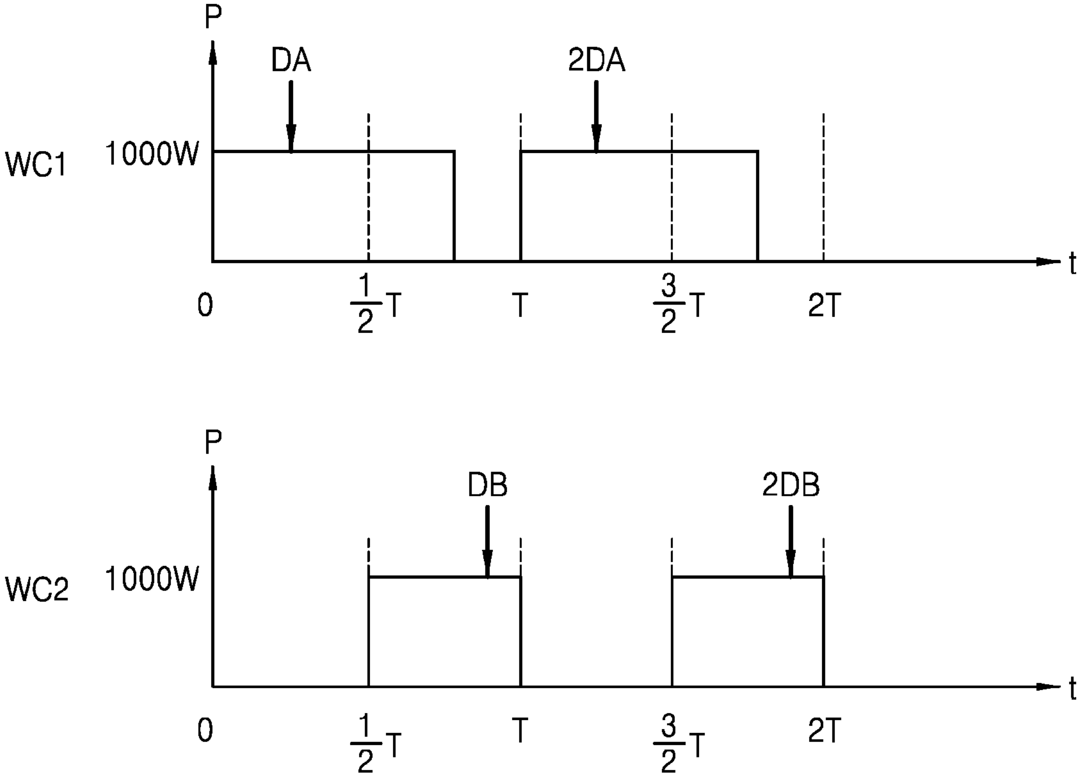

[Fig. 14]
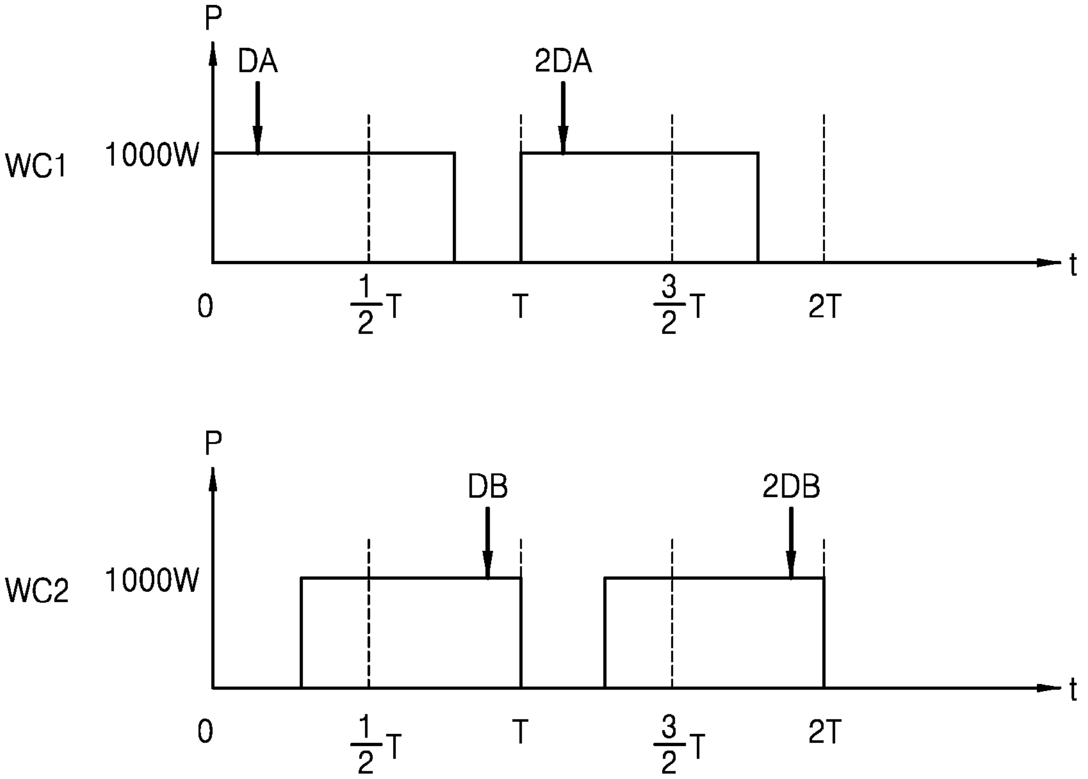
[Fig. 15]
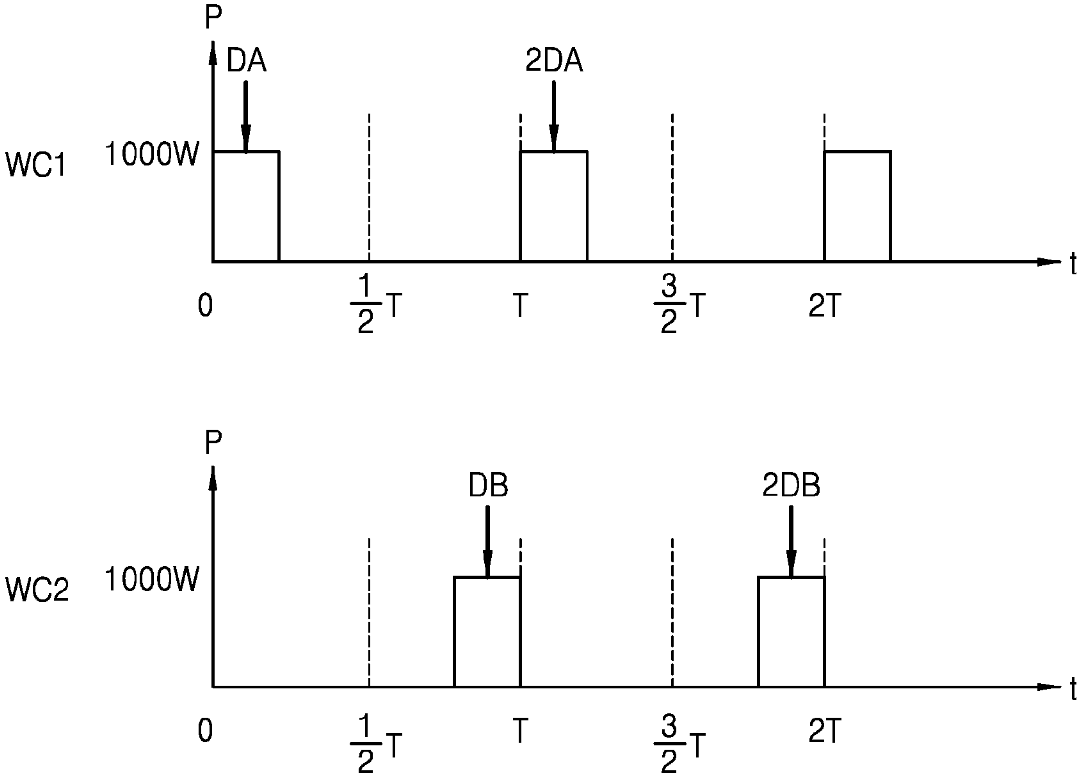

[Fig. 16]
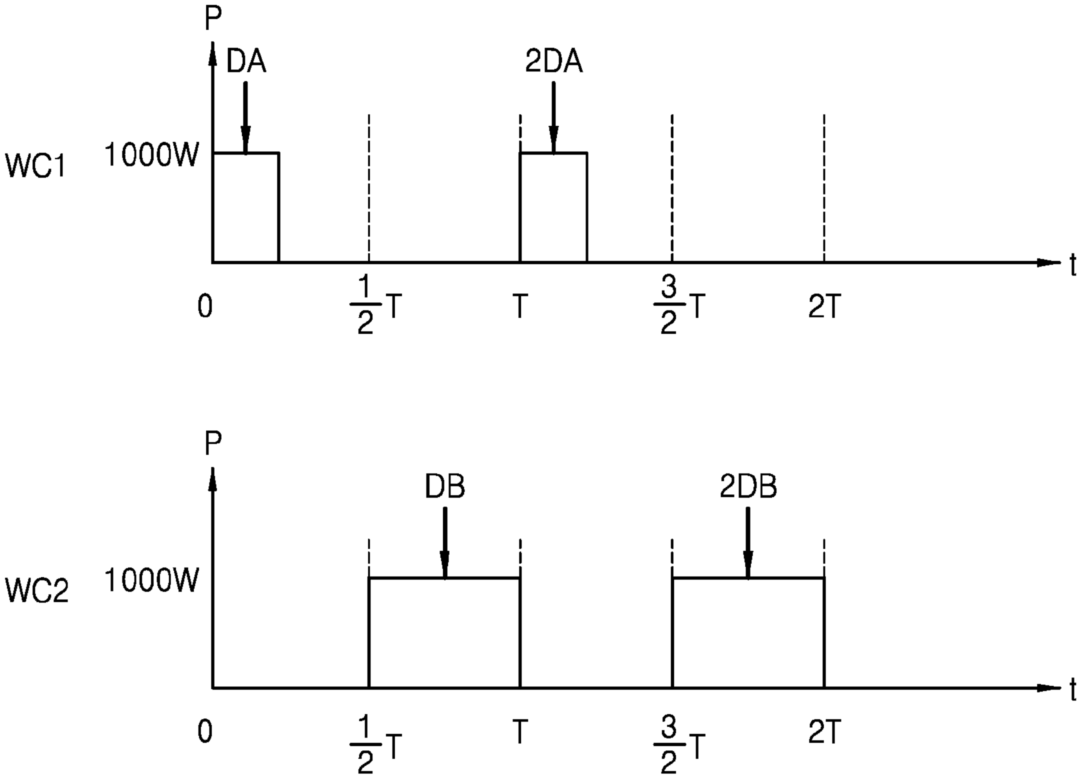
[Fig. 17]
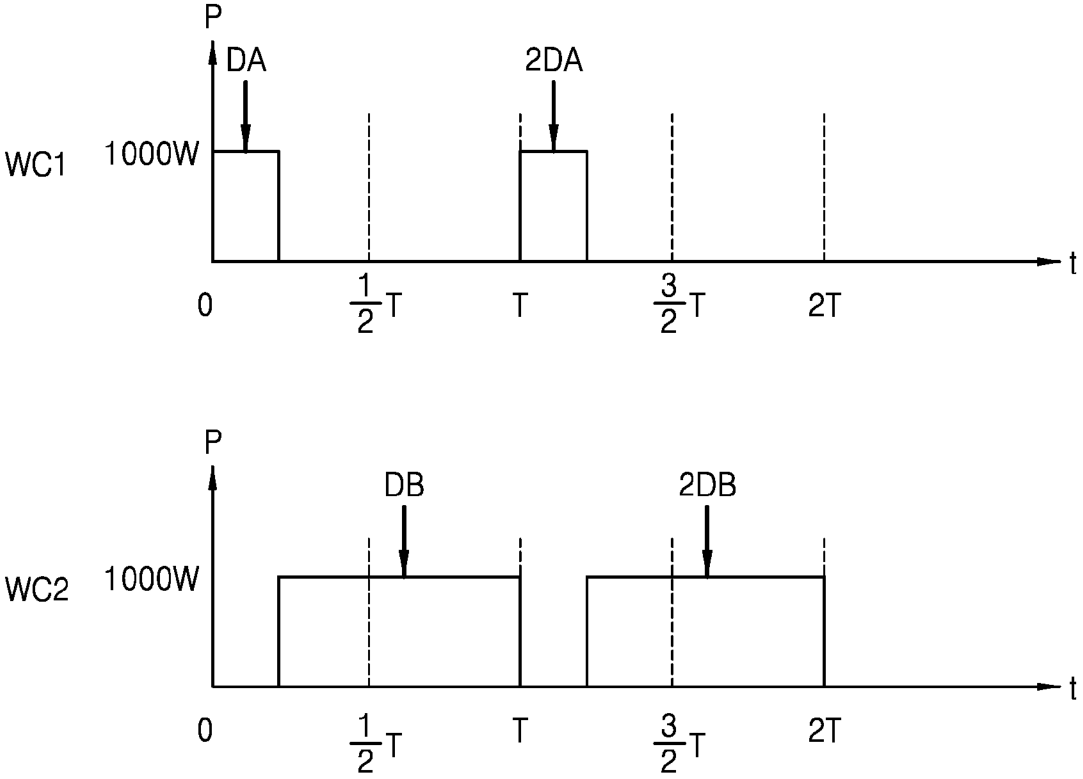

[Fig. 18]
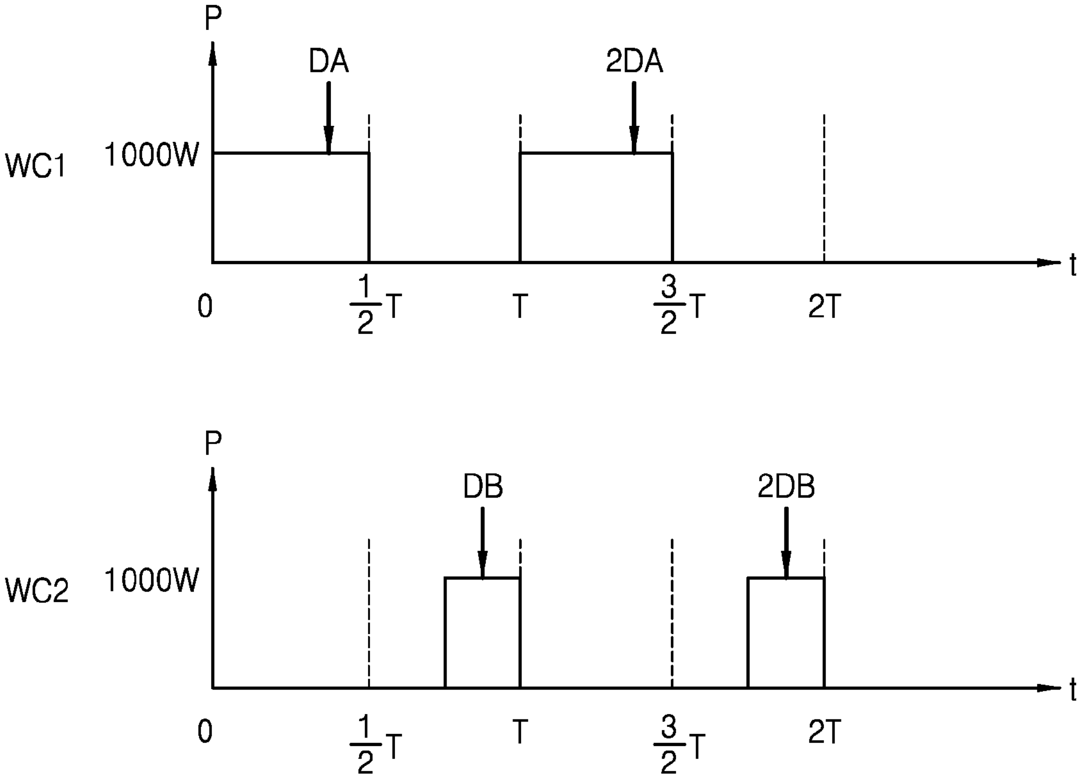
[Fig. 19]
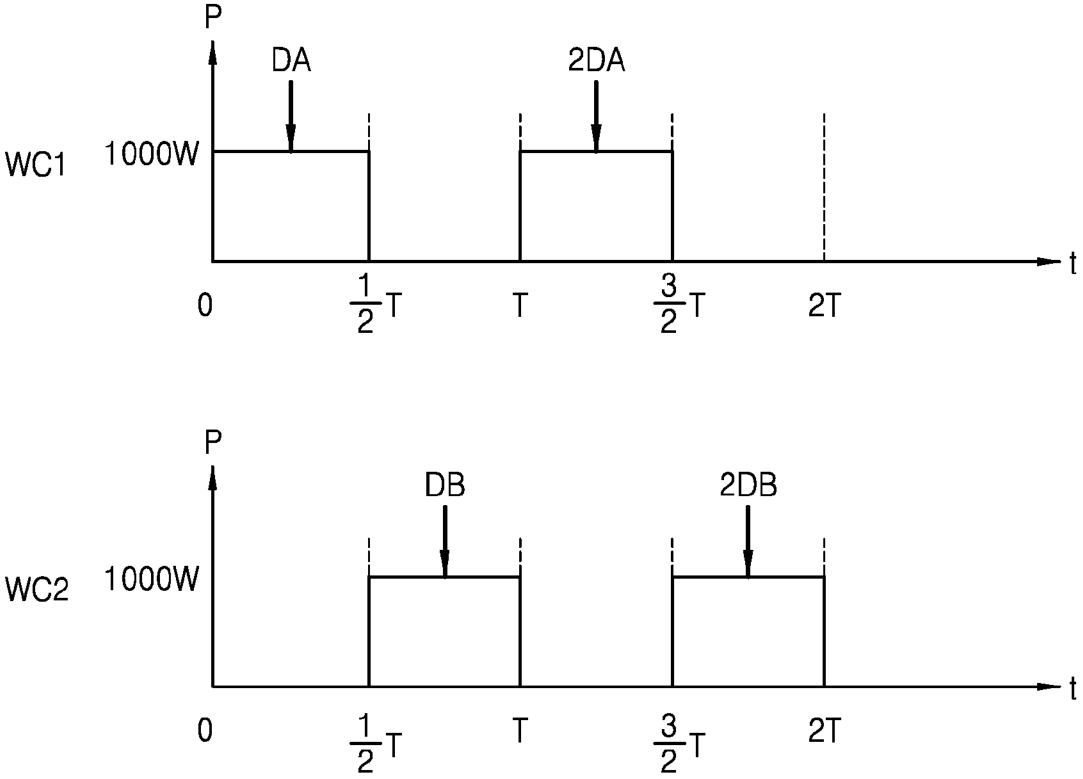

[Fig. 20]
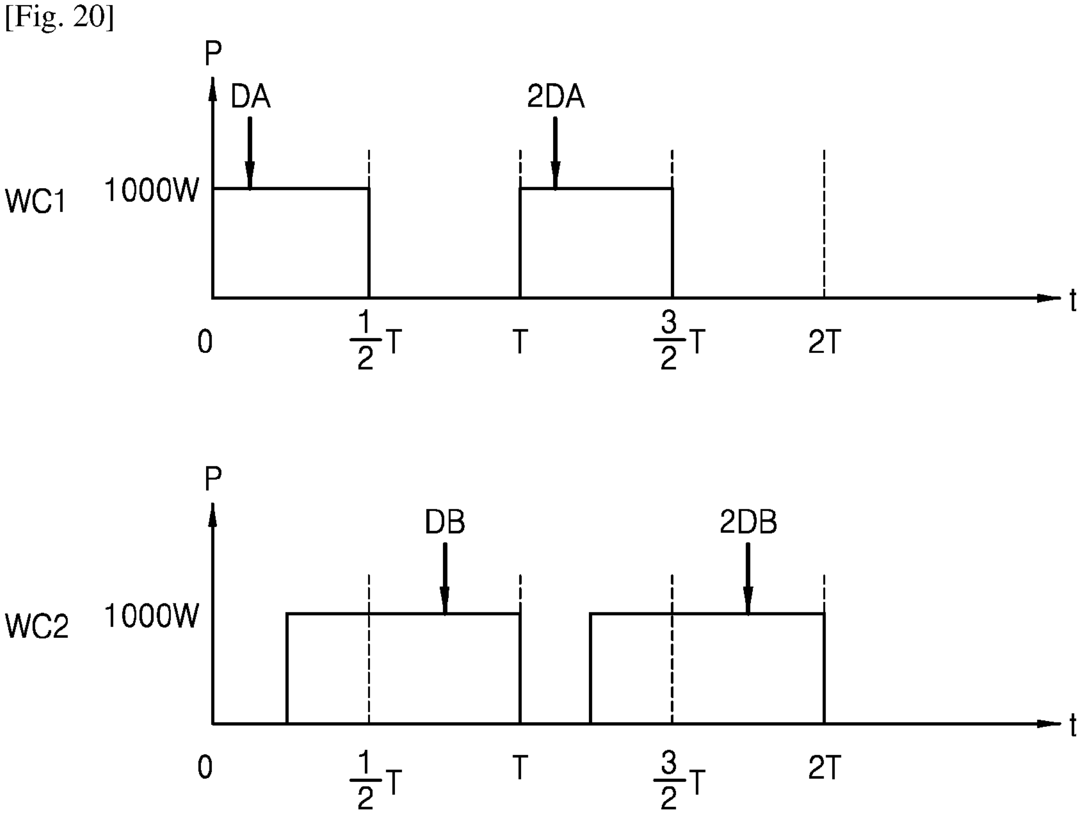

[Fig. 21]
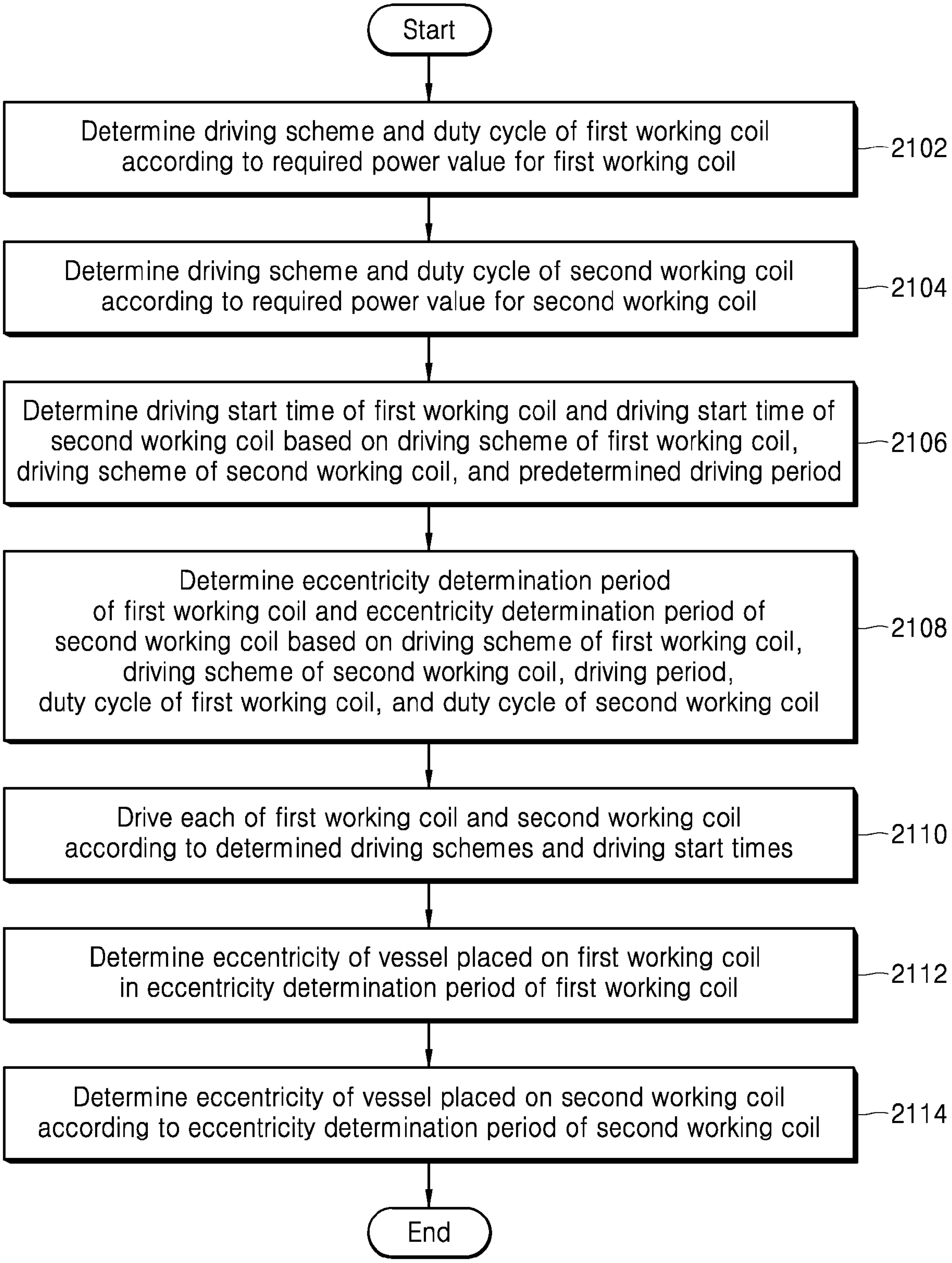

INDUCTION HEATING DEVICE AND METHOD OF CONTROLLING THE SAME

CROSS-REFERENCE TO RELATED PATENT APPLICATIONS

This application is a U.S. National Stage Application under 35 U.S.C. § 371 of PCT Application No. PCT/KR2019/011172, filed Aug. 30, 2019, which claims priority to U.S. Provisional Application No. 62/724,733, filed Aug. 30, 2018, whose entire disclosures are hereby incorporated by reference.

TECHNICAL FIELD

The disclosure relates to an induction heating device and a method of controlling the induction heating device.

BACKGROUND ART

An induction heating device is a device including one or more working coils to heat food vessels via induction heating. When electrical energy is supplied to the working coils, magnetic fields are produced around the working coils. The magnetic fields allow eddy currents to flow through the vessels on the working coils, thereby heating the vessels.

FIG. 1 illustrates an example in which a vessel is placed on a heating area of an induction heating device according to the prior art.

One or more heating areas 12, 14, and 16 are shown on the top plate 10 of the conventional induction heating device 1. Working coils are placed under their respective corresponding heating areas 12, 14, and 16 to heat vessels.

The user places a vessel on one of the heating areas 12, 14, and 16, sets a heating level via a control panel 18, and inputs a heating command to the heating area on which the vessel is placed. For example, the user puts a vessel 11 on a first heating area 12 and sets the heating level of the first heating area 12 to 4 via the control panel 18. Thus, a heating command is input to the first heating area 12. As the heating command is input, a required power value (e.g., 1,000 W) corresponding to the heating level input by the user is determined, and the first working coil disposed under the first heating area 12 is driven to feed power of the determined required power value to the vessel.

According to the prior art, the driving scheme of the working coil may be varied depending on the required power value set for the working coil. For example, if the required power value for the working coil is a predetermined reference power value (e.g., 500 W) or more, the working coil is driven linearly. For example, if the required power value for the first working coil is determined to be 1,000 W, the first working coil is linearly driven to continuously deliver a power of 1,000 W as shown in FIG. 2.

In contrast, if the required power value for the working coil is less than the reference power value, the working coil is duty-driven. For example, if the required power value for the first working coil is determined to be 400 W, the first working coil is driven while repeating its on and off states based on the duty cycle corresponding to the required power value as shown in FIG. 3. FIG. 3 illustrates the output power value of the first working coil when the first working coil has a predetermined driving period T and its duty cycle is set to 50%. Since the duty cycle is 50%, each of the on-time TA and the off-time (TB) within one driving period T is set to ½T.

When the working coil is driven to heat the vessel, the center of the vessel 11 may not match the center of the heating area 12 as shown in FIG. 1. When the center of the vessel does not match the center of the heating area (or working coil), namely, when the vessel is not aligned with the heating area (or working coil), the vessel is defined as being in eccentricity.

If the vessel is in eccentricity, the power delivered to the vessel by the working coil is lowered. Thus, more current is supplied to the working coil to allow the magnitude of power delivered by the working coil to match the required power value. Supply of more current to the working coil may damage the internal circuitry or elements constituting the internal circuitry or cause a malfunction of the induction heating device.

Where the induction heating device includes two or more working coils and the working coils are driven simultaneously as shown in FIG. 1, if a vessel placed on any one working coil is in eccentricity, then the magnitude of current supplied to the working coil increases and, thus, the output power for the other working coils may be lowered.

To address such issues, the conventional induction heating device comes with the functionality of periodically judging the eccentricity of the vessel while the working coil is driven. The eccentricity of the vessel is determined by comparing the input current or voltage to the working coil with a predetermined reference value.

FIGS. 3, 4, and 5 illustrate variations in output power of each working coil and the period of determining the eccentricity of the vessel placed on each working coil when the first working coil WC1 under the first heating area 12 and the second working coil WC2 under the second heating area 14 of the induction heating device 1 are driven.

FIG. 4 illustrates the output power of each working coil when the first working coil WC1 and the second working coil WC2 both are driven linearly as shown in FIG. 2. Each working coil has its own period of determination of the eccentricity of the vessel. In the embodiment of FIG. 4, the first working coil WC1 has a period of determination DA, and the second working coil WC2 has a period of determination DB.

To precisely measure the input current or output power of any one working coil to determine the eccentricity of the vessel placed on the working coil, the other working coil temporarily stops running. For example, at the eccentricity determination times DA and 2DA of the first working coil WC1, the second working coil WC2 temporarily stops running (412 and 414). Likewise, at the eccentricity determination times DB and 2DB of the second working coil WC2, the first working coil WC1 temporarily stops running (402 and 404).

If the periods of determination are set so that the determination of eccentricity is performed at different times for the working coils, the determination of eccentricity for each working coil is made normally.

FIG. 5 illustrates the output power of each working coil when the first working coil WC1 is linearly driven, and the second working coil WC2 is duty-driven.

Referring to FIG. 5, at the eccentricity determination times DB and 2DB of the second working coil WC2, the first working coil WC1 temporarily stops running (502 and 504).

If the eccentricity determination times DA and 2DA of the first working coil WC1 match the eccentricity determination times DB and 2DB of the second working coil WC2 as shown in FIG. 5, the first working coil WC1 and the second working coil WC2 are forced to stop running. This renders it impossible to determine the eccentricity of the vessels placed on the first working coil WC1 and the second working coil WC2, thus failing to guarantee normal driving of each working coil.

FIG. 6 illustrates the output power of each working coil when the first working coil WC1 is duty-driven, and the second working coil WC2 is duty-driven.

Since the first working coil WC1 is in the off state at the eccentricity determination times DB and 2DB of the second working coil WC2 as shown in FIG. 5, power supply to the first working coil WC1 may be performed normally.

However, if the eccentricity determination times DA and 2DA of the first working coil WC1 overlap the on-time of the second working coil WC2 according to the driving period T, the second working coil WC2 is forced to stop running during times 602 and 604 for determination of the eccentricity of the first working coil WC1. Thus, normal power supply might not be achieved due to the second working coil WC2.

As such, according to the prior art, if the respective eccentricity determination times of two working coils overlap each other or unless an adequate driving period and eccentricity determination period are set for each working coil when at least one of the two working coils is duty-driven, determination of the eccentricity for the vessels may be rendered impossible or no guarantee may be given of normal power supply to each working coil.

DISCLOSURE OF INVENTION

Technical Problem

The disclosure aims to provide an induction heating device, and a method of controlling the induction heating device, which may prevent such an occasion that determination of eccentricity is rendered impossible as the respective eccentricity determination periods of working coils are set to be identical to each other when the eccentricity of vessels is determined in an induction heating device with the two or more working coils.

Another object of the disclosure is to provide an induction heating device and, a method of controlling the induction heating device, which upon determining the eccentricity of a vessel placed on any one of two or more working coils included in the induction heating device, may prevent a lowering of output power of the other working coils, thereby enabling more stable supply of power.

The disclosure is not limited to the foregoing objectives, but other objects and advantages will be readily appreciated and apparent from the following detailed description of embodiments of the disclosure. It will also be appreciated that the objects and advantages of the disclosure may be achieved by the means shown in the claims and combinations thereof.

Solution to Problem

According to an embodiment of the disclosure, a method of controlling an induction heating device comprises determining a driving scheme and duty cycle of a first working coil according to a required power value for the first working coil, determining a driving scheme and duty cycle of a second working coil according to a required power value for the second working coil, determining a driving start time of the first working coil and a driving start time of the second working coil based on the driving scheme of the first working coil, the driving scheme of the second working coil, and a predetermined driving period, determining an eccentricity determination period of the first working coil and an eccentricity determination period of the second working coil based on the driving scheme of the first working coil, the driving scheme of the second working coil, the driving period, the duty cycle of the first working coil, and the duty cycle of the second working coil, driving each of the first working coil and the second working coil according to the driving scheme and the driving start times, determining eccentricity of a vessel placed on the first working coil according to the eccentricity determination period of the first working coil, and determining eccentricity of a vessel placed on the second working coil according to the eccentricity determination period of the second working coil.

According to an embodiment of the disclosure, if the required power values are a predetermined reference power value, the driving scheme is determined to be a linear driving scheme and, if the required power values are less than the predetermined reference power value, the driving scheme is determined to be a duty driving scheme.

According to an embodiment of the disclosure, if a driving scheme of the first working coil is a linear driving scheme, and a driving scheme of the second working coil is a linear driving scheme, the driving start time of the first working coil is set to be identical to the driving period, and the driving start time of the second working coil is set to be identical to ½ of the driving period.

According to an embodiment of the disclosure, if a driving scheme of the first working coil is a linear driving scheme, and a driving scheme of the second working coil is a linear driving scheme, the eccentricity determination period of the first working coil is set to be identical to ½ of the driving period, and the eccentricity determination period of the second working coil is set to identical to the driving period.

According to an embodiment of the disclosure, if a driving scheme of the first working coil is a linear driving scheme, and a driving scheme of the second working coil is a duty driving scheme, the driving start time of the first working coil is set to be identical to the driving period, and the driving start time of the second working coil is set to be identical to the driving period less an on-time of the second working coil.

According to an embodiment of the disclosure, if a driving scheme of the first working coil is a linear driving scheme, and a driving scheme of the second working coil is a duty driving scheme, the eccentricity determination period of the first working coil is set to be identical to ½ of an off-time of the second working coil, and the eccentricity determination period of the second working coil is set to identical to ½ of an on-time of the second working coil.

According to an embodiment of the disclosure, if a driving scheme of the first working coil is a duty driving scheme, and a driving scheme of the second working coil is a duty driving scheme, the driving start time of the first working coil is set to be identical to the driving period, and the driving start time of the second working coil is set to be identical to the driving period less an on-time of the second working coil.

According to an embodiment of the disclosure, if a driving scheme of the first working coil is a duty driving scheme, and a driving scheme of the second working coil is a duty driving scheme, the eccentricity determination period of the first working coil and the eccentricity determination period of the second working coil are set to differ depending on an on-time of the first working coil and an on-time of the second working coil.

According to an embodiment of the disclosure, if the on-time of the first working coil is larger than ½ of the driving period, and the on-time of the second working coil is equal or larger than ½ of the driving period, the eccentricity determination period of the first working coil is set to be identical to ½ of an off-time of the second working coil, and the eccentricity determination period of the second working coil is set to be identical to an off-time of the first working coil.

According to an embodiment of the disclosure, if the on-time of the first working coil is larger than ½ of the driving period, and the on-time of the second working coil is smaller than ½ of the driving period, the eccentricity determination period of the first working coil is set to be identical to ½ of the on-time of the first working coil, and the eccentricity determination period of the second working coil is set to be identical to ½ of the on-time of the second working coil.

According to an embodiment of the disclosure, if the on-time of the first working coil is smaller than ½ of the driving period, the eccentricity determination period of the first working coil is set to be identical to ½ of the on-time of the first working coil, and the eccentricity determination period of the second working coil is set to be identical to ½ of the on-time of the second working coil.

According to an embodiment of the disclosure, if the on-time of the first working coil is equal to ½ of the driving period, and the on-time of the second working coil is equal or smaller than ½ of the driving period, the eccentricity determination period of the first working coil is set to be identical to ½ of the on-time of the first working coil, and the eccentricity determination period of the second working coil is set to be identical to ½ of the on-time of the second working coil.

According to an embodiment of the disclosure, if the on-time of the first working coil is equal to ½ of the driving period, and the on-time of the second working coil is larger than ½ of the driving period, the eccentricity determination period of the first working coil is set to be identical to ½ of an off-time of the second working coil, and the eccentricity determination period of the second working coil is set to be identical to ½ of an off-time of the first working coil.

Advantageous Effects of Invention

By the present disclosure, such an occasion may be prevented that determination of eccentricity is rendered impossible as the respective eccentricity determination periods of working coils are set to be identical to each other in an induction heating device with the two or more working coils.

Upon determining the eccentricity of a vessel placed on any one of two or more working coils included in an induction heating device, a lowering of output power of the other working coils may be prevented by the present disclosure.

BRIEF DESCRIPTION OF DRAWINGS

A more complete appreciation of the present disclosure and many of the attendant aspects thereof will be readily obtained as the same becomes better understood by reference to the following detailed description when considered in connection with the accompanying drawings, wherein:

FIG. 1 illustrates an example in which a vessel is placed on a heating area of an induction heating device according to the prior art;

FIGS. 2, 3, 4, 5, and 6 illustrate variations in the eccentricity determination period of a vessel placed on each working coil and the output power of each working coil when a first working coil and a second working coil of an induction heating device are driven according to the prior art;

FIG. 7 illustrates a configuration of an induction heating device according to an embodiment of the disclosure;

FIG. 8 illustrates variations in the eccentricity determination period of a vessel placed on each working coil and the output power of each working coil when a first working coil of an induction heating device is linearly driven, and a second working coil of the induction heating device is linearly driven, according to an embodiment of the disclosure;

FIGS. 9, 10, and 11 illustrate variations in the eccentricity determination period of a vessel placed on each working coil and the output power of each working coil when a first working coil of an induction heating device is linearly driven, and a second working coil of the induction heating device is duty-driven, according to an embodiment of the disclosure;

FIGS. 12, 13, and 14 illustrate variations in the eccentricity determination period of a vessel placed on each working coil and the output power of each working coil when a first working coil of an induction heating device is duty-driven, an on-time of the first working coil is larger than ½ of a driving period, and a second working coil of the induction heating device is duty-driven, according to an embodiment of the disclosure;

FIGS. 15, 16, and 17 illustrate variations in the eccentricity determination period of a vessel placed on each working coil and the output power of each working coil when a first working coil of an induction heating device is duty-driven, an on-time of the first working coil is smaller than ½ of a driving period, and a second working coil of the induction heating device is duty-driven, according to an embodiment of the disclosure;

FIGS. 18, 19, and 20 illustrate variations in the eccentricity determination period of a vessel placed on each working coil and the output power of each working coil when a first working coil of an induction heating device is duty-driven, an on-time of the first working coil is equal to ½ of a driving period, and a second working coil of the induction heating device is duty-driven, according to an embodiment of the disclosure; and FIG. 21 is a flowchart illustrating a method of controlling an induction heating device according to an embodiment of the disclosure.

MODE FOR THE INVENTION

The foregoing objectives, features, and advantages are described below in detail with reference to the accompanying drawings so that the technical spirit of the disclosure may easily be achieved by one of ordinary skill in the art to which the invention pertains. When determined to make the subject matter of the disclosure unclear, the detailed description of the known art or functions may be skipped. Hereinafter, preferred embodiments of the disclosure are described in detail with reference to the accompanying drawings. The same reference denotations are used to refer to the same or similar elements throughout the drawings.

FIG. 7 illustrates a configuration of an induction heating device according to an embodiment of the disclosure.

Referring to FIG. 7, according to an embodiment of the disclosure, an induction heating device 2 includes a rectifying circuit 204, a smoothing circuit L, C1, a first working coil WC1, a second working coil WC2, inverter circuits, a control circuit 20, and a driving circuit 21.

The induction heating device 2 is driven by power supplied from an input power source 202. The rectifying circuit 204 rectifies an alternating current (AC) input voltage supplied from the input power source 202 and outputs a pulse waveform of voltage.

The smoothing circuit L, C1 smooths the voltage rectified by the rectifying circuit 204 and outputs a direct current (DC) link voltage. The smoothing circuit L, C1 includes an inductor L and a DC link capacitor C1.

The inverter circuits converts the DC link voltage output from the smoothing circuit L, C1 into an AC voltage for driving each working coil WC1 and WC2. A first inverter circuit includes a first capacitor C2, a second capacitor C3, a first switching element SW1, and a second switching element SW2. A second inverter circuit includes a third capacitor C4, a fourth capacitor C5, a third switching element SW3, and a fourth switching element SW4.

The first switching element SW1 and the second switching element SW2 are alternately turned on/off by a first inverter driving signal S1 and a second inverter driving signal S2 output from the driving circuit 21. The third switching element SW3 and the fourth switching element SW4 are alternately turned on/off by a third inverter driving signal S3 and a fourth inverter driving signal S4 output from the driving circuit 21.

The first inverter driving signal S1, the second inverter driving signal S2, the third inverter driving signal S3, and the fourth inverter driving signal S4 each are a pulse width modulation (PWM) signal with a predetermined duty cycle. If the first inverter driving signal S1 and the second inverter driving signal S2 are applied to the first switching element SW1 and the second switching element SW2, respectively, the first switching element SW1 and the second switching element SW2 are alternately turned on/off so that the DC link voltage is converted into an AC voltage. If the third inverter driving signal S3 and the fourth inverter driving signal S4 are applied to the third switching element SW3 and the fourth switching element SW4, respectively, the third switching element SW3 and the fourth switching element SW4 are alternately turned on/off so that the DC link voltage is converted into an AC voltage.

The AC voltages output from the inverter circuits are applied to the working cols WC1 and WC2. If the AC voltages are applied, the working coils WC1 and WC2 are driven. If the working coils WC1 and WC2 are driven, eddy currents flow through the vessels placed on the working coils WC1 and WC2, thereby heating the vessels. When the working coils WC1 and WC2 are driven, the magnitude of thermal energy supplied to the vessels is varied depending on the magnitude of power produced by the working coils WC1 and WC2, i.e., the output power values of the working coils.

The control circuit 20 determines the respective driving frequencies of the inverter circuits and supplies control signals corresponding to the determined driving frequencies to the driving circuit 21. The driving circuit 21 outputs inverter driving signals S1 to S4 with duty cycles corresponding to the driving frequencies determined by the control circuit 20.

The user places vessels on the working coils WC1 and WC2 of the induction heating device and sets heating levels for the vessels, thereby issuing heating start commands to the working coils WC1 and WC2. If the user issues the heating start commands, output power values required for the working coils WC1 and WC2, i.e., required power values, are determined depending on the heating levels set by the user.

Receiving the user's heating start commands, the control circuit 20 sets driving frequencies corresponding to the required power values and supplies control signals corresponding to the set driving frequencies to the driving circuit 21. Thus, the inverter driving signals S1 to S4 are output from the driving circuit 21 so that the working coils WC1 and WC2 are driven. As the working coils WC1 and WC2 are driven, the vessels placed by the user are heated.

If the user's heating commands are input, the control circuit 20 drives each working coil WC1 and WC2 based on a predetermined driving period T.

The control circuit 20 determines a driving scheme (e.g., linear driving or duty driving) and duty cycle for each working coil WC1 and WC2 based on the required power value for each working coil WC1 and WC2 set by the user's heating commands. For example, if the required power value for each working coil WC1 and WC2 is a predetermined reference power value (e.g., 500 W) or more, the working coil is linearly driven. For example, if the required power value for the first working coil is determined to be 1,000 W, the first working coil is linearly driven to continuously deliver a power of 1,000 W as shown in FIG. 2.

In contrast, if the required power value for the working coil is less than the reference power value, the working coil is duty-driven. For example, if the required power value for the first working coil is determined to be 400 W, the first working coil is driven while repeating its on and off states based on the duty cycle corresponding to the required power value as shown in FIG. 3.

If the driving scheme of each working coil WC1 and WC2 is determined to be a duty driving scheme, the duty cycle of each working coil WC1 and WC2 may be set to differ depending on the required power value. As the required power value increases, a larger duty cycle is set, and a longer on-time is set for the working coil.

When the working coils WC1 and WC2 are driven, the control circuit 20 obtains an input voltage measured by a voltage sensor 22 and an input current measured by a current sensor 23. The control circuit 20 may calculate the magnitude of power supplied to the working coils WC1 and WC2, i.e., input power values of the working coils WC1 and WC2, based on the obtained input voltage and input current.

The control circuit 20 may compare the calculated input power value of each working coil WC1 and WC2 with a predetermined reference value, thereby determining the eccentricity of the vessel placed on each working coil WC1 and WC2. For example, if the input power value measured while the first working coil WC1 is driven is larger than the reference value, the control circuit 20 may determine that the vessel placed on the first working coil WC1 is in eccentricity.

According to an embodiment, the control circuit 20 may compare the input current measured by the current sensor 23 with a predetermined reference value, thereby determining the eccentricity of the vessel placed on each working coil WC1 and WC2. For example, if the input current value measured while the first working coil WC1 is driven is larger than the reference value, the control circuit 20 may determine that the vessel placed on the first working coil WC1 is in eccentricity.

The control circuit 20 temporarily stops driving the other working coil than the working coil which is the target for determining the eccentricity of the vessel. For example, the control circuit 20 temporarily stops driving the second working coil WC2 at the time of determining the eccentricity of the vessel placed on the first working coil WC1.

Described below is an example driving process of an induction heating device according to the user's input of heating commands. Although an embodiment is described below in which a vessel is placed on each of the first working coil WC1 and the second working coil WC2 of the induction heating device, and heating commands are then input, the method of controlling an induction heating device may also apply to induction heating devices with three or more working coils according to an embodiment of the disclosure.

If the user sets a heating level for the vessel placed on each of the first working coil WC1 and the second working coil WC2 through a control panel of the induction heating device, a heating command for each of the first working coil WC1 and the second working coil WC2 is input.

The control circuit 20 determines a required power value corresponding to the heating level which the user has set for each working coil. The control circuit 20 determines that the driving scheme of each working coil is a linear driving scheme or duty driving scheme according to the required power value of each working coil. If the required power value is a reference power value or more, the driving scheme of the working coil is determined to be a linear driving scheme and, if the required power value is smaller than the reference power value, the driving scheme of the working coil is determined to be a duty driving scheme.

If the driving scheme of the working coil is determined to be a duty driving scheme, the control circuit 20 determines the duty cycle of the working coil, i.e., the on-time and off-time of the working coil during a predetermined driving period T, according to the required power value of the working coil. As the required power value increases, a larger duty cycle is set, and a longer on-time is set for the working coil.

The control circuit 20 starts a driving start time of each working coil based on the determined driving scheme of each working coil and the predetermined driving period T. The control circuit 20 determines the eccentricity determination period of each working coil based on the driving scheme of each working coil, driving period T, and the duty cycle of each working coil.

Now described with reference to FIGS. 8 to 20 are embodiments in which the control circuit 20 sets the driving start time and eccentricity determination period of each working coil according to the driving scheme and duty cycle of each working coil.

FIG. 8 illustrates variations in the eccentricity determination period of a vessel placed on each working coil and the output power of each working coil when a first working coil of an induction heating device is linearly driven, and a second working coil of the induction heating device is linearly driven, according to an embodiment of the disclosure.

According to an embodiment of the disclosure, if the driving schemes of the first working coil WC1 and the second working coil WC2 are both determined to be a linear driving scheme, the driving start time of the first working coil WC1 is set to be identical to a predetermined driving period T, and the driving start time of the second working coil WC2 is set to be identical to ½ of the driving period T.

If the driving schemes of the first working coil WC1 and the second working coil WC2 are both determined to be a linear driving scheme as shown in FIG. 8, the eccentricity determination period DA of the first working coil WC1 is set to be identical to ½ of the driving period T, and the eccentricity determination period DB of the second working coil WC2 is set to be identical to the driving period T.

The control circuit 20 drives the first working coil WC1 and the second working coil WC2 based on the determined driving start times and eccentricity determination periods. As shown in FIG. 8, the second working coil WC2 temporarily stops running at the eccentricity determination times DA and 2DA of the vessel placed on the first working coil WC1 (812 and 814), and the first working coil WC1 temporarily stops running at the eccentricity determination times DB and 2DB of the vessel placed on the second working coil WC2 (802 and 804).

FIGS. 9, 10, and 11 illustrates variations in the eccentricity determination period of a vessel placed on each working coil and the output power of each working coil when a first working coil of an induction heating device is linearly driven, and a second working coil of the induction heating device is duty-driven, according to an embodiment of the disclosure.

In the embodiments of FIGS. 9, 10, and 11, the first working coil WC1 is linearly driven. In the embodiments of FIGS. 9, 10, and 11, the second working coil WC2 is duty-driven based on different duty cycles. In the embodiment of FIG. 9, the on-time of the second working coil WC2 is set to be smaller than ½ of the driving period T. In the embodiment of FIG. 10, the on-time of the second working coil WC2 is set to be identical to ½ of the driving period T. In the embodiment of FIG. 11, the on-time of the second working coil WC2 is set to be larger than ½ of the driving period T.

According to an embodiment of the disclosure, if the first working coil WC1 is linearly driven, and the second working coil WC2 is duty-driven, the driving start time of the first working coil WC1 is set to be identical to the driving period T, and the driving start time of the second working coil WC2 is set to be identical to the driving period T less the on-time of the second working coil.

If the first working coil WC1 is linearly driven, and the second working coil WC2 is duty-driven as shown in FIGS. 9 to 11, the eccentricity determination period DA of the first working coil WC1 is set to be identical to ½ of the off-time of the second working coil, and the eccentricity determination period DB of the second working coil WC2 is set to be identical to ½ of the on-time of the second working coil WC2.

The control circuit 20 drives the first working coil WC1 and the second working coil WC2 based on the determined driving start times and eccentricity determination periods. As shown in FIGS. 9 to 11, the first working coil WC1 temporarily stops running at the eccentricity determination times DB and 2DB of the vessel placed on the second working coil WC2 (902, 904, 1002, 1004, 1102, and 1104).

Since the eccentricity determination times DA and 2DA of the first working coil WC1 both are set to fall within the off-time of the second working coil WC2 as shown in FIGS. 9, 10, and 11, the second working coil WC2 is prevented from forced stop when the eccentricity of the vessel placed on the first working coil WC1 is determined. Thus, power supply by the second working coil WC2 may be performed stably.

FIGS. 12, 13, and 14 illustrate variations in the eccentricity determination period of a vessel placed on each working coil and the output power of each working coil when a first working coil of an induction heating device is duty-driven, an on-time of the first working coil is larger than ½ of a driving period, and a second working coil of the induction heating device is duty-driven, according to an embodiment of the disclosure.

In the embodiments of FIGS. 12, 13, and 14, the first working coil WC1 and the second working coil WC2 both are duty-driven.

In the embodiments of FIGS. 12, 13, and 14, the on-time of the first working coil WC1 is set to be larger than ½ of the driving period T.

In the embodiment of FIG. 12, the on-time of the second working coil WC2 is set to be smaller than ½ of the driving period T. In the embodiment of FIG. 13, the on-time of the second working coil WC2 is set to be identical to ½ of the driving period T. In the embodiment of FIG. 14, the on-time of the second working coil WC2 is set to be larger than ½ of the driving period T.

According to an embodiment of the disclosure, if the driving schemes of the first working coil WC1 and the second working coil WC2 are both determined to be a duty driving scheme, the driving start time of the first working coil WC1 is set to be identical to the driving period T, and the driving start time of the second working coil WC2 is set to be identical to the driving period T less the on-time of the second working coil WC2.

If the on-time of the first working coil WC1 is larger than ½ of the driving period T, and the on-time of the second working coil WC2 is smaller than ½ of the driving period T as shown in FIG. 12, the eccentricity determination period DA of the first working coil WC1 is set to be identical to ½ of the on-time of the first working coil WC1, and the eccentricity determination period DB of the second working coil WC2 is set to be identical to ½ of the on-time of the second working coil WC2.

If the on-time of the first working coil WC1 is larger than ½ of the driving period T, and the on-time of the second working coil WC2 is equal or larger than ½ of the driving period T as shown in FIGS. 13 and 14, the eccentricity determination period DA of the first working coil WC1 is set to be identical to ½ of the off-time of the second working coil WC2, and the eccentricity determination period DB of the second working coil WC2 is set to be identical to ½ of the off-time of the first working coil WC1.

The control circuit 20 drives the first working coil WC1 and the second working coil WC2 based on the determined driving start times and eccentricity determination periods. Since the eccentricity determination times DA and 2DA of the first working coil WC1 both are set to fall within the off-time of the second working coil WC2 as shown in FIGS. 12, 13, and 14, the second working coil WC2 is prevented from forced stop when the eccentricity of the vessel placed on the first working coil WC1 is determined. Since the eccentricity determination times DB and 2DB of the second working coil WC2 both are set to fall within the off-time of the first working coil WC1, the first working coil WC1 is prevented from forced stop when the eccentricity of the vessel placed on the second working coil WC2 is determined.

Thus, power supply by the first working coil WC1 and the second working coil WC2 may be performed stably.

FIGS. 15, 16, and 17 illustrate variations in the eccentricity determination period of a vessel placed on each working coil and the output power of each working coil when a first working coil of an induction heating device is duty-driven, an on-time of the first working coil is smaller than ½ of a driving period, and a second working coil of the induction heating device is duty-driven, according to an embodiment of the disclosure.

In the embodiments of FIGS. 15, 16, and 17, the on-time of the first working coil WC1 is set to be smaller than ½ of the driving period T.

In the embodiment of FIG. 15, the on-time of the second working coil WC2 is set to be smaller than ½ of the driving period T. In the embodiment of FIG. 16, the on-time of the second working coil WC2 is set to be identical to ½ of the driving period T. In the embodiment of FIG. 17, the on-time of the second working coil WC2 is set to be larger than ½ of the driving period T.

According to an embodiment of the disclosure, if the driving schemes of the first working coil WC1 and the second working coil WC2 are both determined to be a duty driving scheme, the driving start time of the first working coil WC1 is set to be identical to the driving period T, and the driving start time of the second working coil WC2 is set to be identical to the driving period T less the on-time of the second working coil WC2.

If the on-time of the first working coil WC1 is smaller than ½ of the driving period T as shown in FIGS. 15, 16, and 17, the eccentricity determination period DA of the first working coil WC1 is set to be identical to ½ of the on-time of the first working coil WC1, and the eccentricity determination period DB of the second working coil WC2 is set to be identical to ½ of the on-time of the second working coil WC2 regardless of the on-time of the second working coil WC2.

The control circuit 20 drives the first working coil WC1 and the second working coil WC2 based on the determined driving start times and eccentricity determination periods. Since the eccentricity determination times DA and 2DA of the first working coil WC1 both are set to fall within the off-time of the second working coil WC2 as shown in FIGS. 15, 16, and 17, the second working coil WC2 is prevented from forced stop when the eccentricity of the vessel placed on the first working coil WC1 is determined. Since the eccentricity determination times DB and 2DB of the second working coil WC2 both are set to fall within the off-time of the first working coil WC1, the first working coil WC1 is prevented from forced stop when the eccentricity of the vessel placed on the second working coil WC2 is determined.

Thus, power supply by the first working coil WC1 and the second working coil WC2 may be performed stably.

FIGS. 18, 19, and 20 illustrate variations in the eccentricity determination period of a vessel placed on each working coil and the output power of each working coil when a first working coil of an induction heating device is duty-driven, an on-time of the first working coil is equal to ½ of a driving period, and a second working coil of the induction heating device is duty-driven, according to an embodiment of the disclosure.

In the embodiments of FIGS. 18, 19, and 20, the first working coil WC1 and the second working coil WC2 both are duty-driven.

In the embodiments of FIGS. 18, 19, and 20, the on-time of the first working coil WC1 is set to be identical to ½ of the driving period T.

In the embodiment of FIG. 18, the on-time of the second working coil WC2 is set to be smaller than ½ of the driving period T. In the embodiment of FIG. 19, the on-time of the second working coil WC2 is set to be identical to ½ of the driving period T. In the embodiment of FIG. 20, the on-time of the second working coil WC2 is set to be larger than ½ of the driving period T.

According to an embodiment of the disclosure, if the driving schemes of the first working coil WC1 and the second working coil WC2 are both determined to be a duty driving scheme, the driving start time of the first working coil WC1 is set to be identical to the driving period T, and the driving start time of the second working coil WC2 is set to be identical to the driving period T less the on-time of the second working coil WC2.

If the on-time of the first working coil WC1 is equal to ½ of the driving period T, and the on-time of the second working coil WC2 is equal or smaller than ½ of the driving period T as shown in FIGS. 18 and 19, the eccentricity determination period DA of the first working coil WC1 is set to be identical to ½ of the on-time of the first working coil WC1, and the eccentricity determination period DB of the second working coil WC2 is set to be identical to ½ of the on-time of the second working coil WC2.

If the on-time of the first working coil WC1 is equal to ½ of the driving period T, and the on-time of the second working coil WC2 is larger than ½ of the driving period T as shown in FIG. 20, the eccentricity determination period DA of the first working coil WC1 is set to be identical to ½ of the off-time of the second working coil WC2, and the eccentricity determination period DB of the second working coil WC2 is set to be identical to ½ of the off-time of the first working coil WC1.

The control circuit 20 drives the first working coil WC1 and the second working coil WC2 based on the determined driving start times and eccentricity determination periods. Since the eccentricity determination times DA and 2DA of the first working coil WC1 both are set to fall within the off-time of the second working coil WC2 as shown in FIGS. 18, 19, and 20, the second working coil WC2 is prevented from forced stop when the eccentricity of the vessel placed on the first working coil WC1 is determined. Since the eccentricity determination times DB and 2DB of the second working coil WC2 both are set to fall within the off-time of the first working coil WC1, the first working coil WC1 is prevented from forced stop when the eccentricity of the vessel placed on the second working coil WC2 is determined.

Thus, power supply by the first working coil WC1 and the second working coil WC2 may be performed stably.

As described above in connection with the embodiments of FIGS. 8 to 20, if the driving start time and eccentricity determination time of each of the first working coil WC1 and the second working coil WC2 are determined, the control circuit 20 drives each of the first working coil WC1 and the second working coil WC2 according to the determined driving scheme and driving start time of each working coil.

Thereafter, the control circuit 20 determines the eccentricity of the vessel placed on each working coil according to the prior-determined eccentricity determination time of each working coil. In other words, the control circuit 20 determines the eccentricity of the vessel placed on the first working coil WC1 at each eccentricity determination time DA and 2DA of the first working coil WC1 and determines the eccentricity of the vessel placed on the second working coil WC2 at each eccentricity determination time DB and 2DB of the second working coil WC2.

If the respective driving start times and eccentricity determination times of the first working coil WC1 and the second working coil WC2 are determined as set forth above in connection with the embodiments of FIGS. 8 to 20, the eccentricity determination time of the first working coil WC1 and the eccentricity determination time of the second working coil WC2 do not overlap each other and, thus, such an occasion may be avoided where determination of eccentricity is rendered impossible due to an overlap between eccentricity determination times. Further, upon determining the eccentricity of the vessel placed on each working coil, the other working coil is prevented from forced stop, and this ensures stable supply of power to each working coil.

FIG. 21 is a flowchart illustrating a method of controlling an induction heating device according to an embodiment of the disclosure.

Referring to FIG. 21, according to an embodiment of the disclosure, a control circuit 20 of an induction heating device 2 determines a driving scheme and duty cycle of a first working coil WC1 according to a required power value for the first working coil WC1 (2102). The control circuit 20 determines a driving scheme and duty cycle of a second working coil WC2 according to a required power value for the second working coil WC2 (2104).

According to an embodiment of the disclosure, if the required power value for the working coil is a predetermined reference power value, the driving scheme of the working coil is determined to be a linear driving scheme and, if the required power value for the working coil is less than the predetermined reference power value, the driving scheme of the working coil is determined to be a duty driving scheme.

According to an embodiment of the disclosure, if the driving scheme of the working coil is a linear driving scheme, the duty cycle of the working coil is determined to be 100%. If the driving scheme of the working coil is a duty driving scheme, the duty cycle of the working coil is determined to differ depending on the required power value for the working coil.

The control circuit 20 determines the driving start time of the first working coil WC1 and the driving start time of the second working coil WC2 based on the driving scheme of the first working coil WC1, the driving scheme of the second working coil WC2, and a predetermined driving period T.

Then, the control circuit 20 determines the eccentricity determination period of the first working coil WC1 and the eccentricity determination period of the second working coil WC2 based on the driving scheme of the first working coil WC1, the driving scheme of the second working coil WC2, the duty cycle of the first working coil WC1, and the duty cycle of the second working coil WC2.

According to an embodiment of the disclosure, the driving start time and eccentricity determination period of each working coil may also be determined as in the embodiments described above in connection with FIGS. 8 to 20.

The control circuit 20 drives each of the first working coil WC1 and the second working coil WC2 at the determined driving scheme and driving start time (2110).

The control circuit 20 determines the eccentricity of the vessel placed on the first working coil WC1 according to the eccentricity determination period of the first working coil WC1 (2112). The control circuit 20 determines the eccentricity of the vessel placed on the second working coil WC2 according to the eccentricity determination period of the second working coil WC2 (2114).

The disclosure may prevent such an occasion that determination of eccentricity is rendered impossible as the respective eccentricity determination periods of working coils are set to be identical to each other in an induction heating device with the two or more working coils.

Upon determining the eccentricity of a vessel placed on any one of two or more working coils included in an induction heating device, the disclosure may prevent a lowering of output power of the other working coils, thereby enabling more stable supply of power.

Various changes in form or detail may be made to the disclosure by one of ordinary skill in the art without departing from the scope of the disclosure, and the disclosure is not limited to the above-described embodiments and the accompanying drawings.

The invention claimed is:

1. A method of controlling an induction heating device, the method comprising:

determining, by a control circuit, a driving scheme and duty cycle of a first working coil according to a required power value for the first working coil;

determining, by the control circuit, a driving scheme and duty cycle of a second working coil according to a required power value for the second working coil;

determining, by the control circuit, a driving start time of the first working coil and a driving start time of the second working coil based on the driving scheme of the first working coil, the driving scheme of the second working coil, and a predetermined driving period of the first working coil and the second working coil;

determining, by the control circuit, an eccentricity determination period of the first working coil and an eccentricity determination period of the second working coil based on the driving scheme of the first working coil, the driving scheme of the second working coil, the driving period, the duty cycle of the first working coil, and the duty cycle of the second working coil;

driving each of the first working coil and the second working coil according to the driving scheme and the driving start times, wherein the driving each of the first working coil and the second working coil includes the control circuit providing control signals to a driving circuit, and based on the control signals, driving signals are output from the driving circuit for providing on-times and off-times of the first working coil and the second working coil;

while the first and second working coils are driven based on the control signals from the control circuit, obtaining voltage values from at least one voltage sensor at the first working coil and the second working coil or obtaining current values from at least one current sensor at the first working coil and the second working coil;

receiving, at the control circuit, the obtained voltage values from the at least one voltage sensor or the obtained current values from the at least one current sensor of each of the first and second working coils;

determining, at the control circuit, input power values of the first working coil and the second working coil based on the received voltage values or the received current values;

determining, by the control circuit, eccentricity of a vessel placed on the first working coil according to the eccentricity determination period of the first working coil, wherein the determining of eccentricity of the vessel placed on the first working coil includes the control circuit comparing the determined input power value of the first working coil with a predetermined reference value; and determining eccentricity of a vessel placed on the second working coil according to the eccentricity determination period of the second working coil, wherein the determining of eccentricity of the vessel placed on the second working coil includes the control circuit comparing the determined input power value of the second working coil with a predetermined reference value, wherein if the driving scheme of the first working coil is a duty driving scheme and the driving scheme of the second working coil is a duty driving scheme, the eccentricity determination period of the first working coil and the eccentricity determination period of the second working coil are set based on a result of comparing the on-time of the first working coil and the on-time of the second working coil with ½ of the driving period, and wherein when one of the first working coil and the second working coil is a target for determining eccentricity of the vessel, driving of another one of the first working coil and the second working coil is stopped.

2. The method of claim 1, wherein if the required power values are a predetermined reference power value, the driving scheme is determined to be a linear driving scheme and, if the required power values are less than the predetermined reference power value, the driving scheme is determined to be a duty driving scheme.

3. The method of claim 1, wherein if the driving scheme of the first working coil is a linear driving scheme, and the driving scheme of the second working coil is a linear driving scheme, the driving start time of the first working coil is set to be identical to the driving period, and the driving start time of the second working coil is set to be identical to ½ of the driving period.

4. The method of claim 1, wherein if the driving scheme of the first working coil is a linear driving scheme, and the driving scheme of the second working coil is a linear driving scheme, the eccentricity determination period of the first working coil is set to be identical to ½ of the driving period, and the eccentricity determination period of the second working coil is set to identical to the driving period.

5. The method of claim 1, wherein if the driving scheme of the first working coil is a linear driving scheme, and the driving scheme of the second working coil is a duty driving scheme, the driving start time of the first working coil is set to be identical to the driving period, and the driving start time of the second working coil is set to be identical to the driving period less an on-time of the second working coil.

6. The method of claim 1, wherein if the driving scheme of the first working coil is a linear driving scheme, and the driving scheme of the second working coil is a duty driving scheme, the eccentricity determination period of the first working coil is set to be identical to ½ of an off-time of the second working coil, and the eccentricity determination period of the second working coil is set to identical to ½ of an on-time of the second working coil.

7. The method of claim 1, wherein if the driving scheme of the first working coil is a duty driving scheme, and the driving scheme of the second working coil is a duty driving scheme, the driving start time of the first working coil is set to be identical to the driving period, and the driving start time of the second working coil is set to be identical to the driving period less an on-time of the second working coil.

8. The method of claim 1, wherein if the on-time of the first working coil is larger than ½ of the driving period, and the on-time of the second working coil is equal or larger than ½ of the driving period, the eccentricity determination period of the first working coil is set to be identical to ½ of an off-time of the second working coil, and the eccentricity determination period of the second working coil is set to be identical to an off-time of the first working coil.

9. The method of claim 1, wherein if the on-time of the first working coil is larger than ½ of the driving period, and the on-time of the second working coil is smaller than ½ of the driving period, the eccentricity determination period of the first working coil is set to be identical to ½ of the on-time of the first working coil, and the eccentricity determination period of the second working coil is set to be identical to ½ of the on-time of the second working coil.

10. The method of claim 1, wherein if the on-time of the first working coil is smaller than ½ of the driving period, the eccentricity determination period of the first working coil is set to be identical to ½ of the on-time of the first working coil, and the eccentricity determination period of the second working coil is set to be identical to ½ of the on-time of the second working coil.

11. The method of claim 1, wherein if the on-time of the first working coil is equal to ½ of the driving period, and the on-time of the second working coil is equal or smaller than ½ of the driving period, the eccentricity determination period of the first working coil is set to be identical to ½ of the on-time of the first working coil, and the eccentricity determination period of the second working coil is set to be identical to ½ of the on-time of the second working coil.

12. The method of claim 1, wherein if the on-time of the first working coil is equal to ½ of the driving period, and the on-time of the second working coil is larger than ½ of the driving period, the eccentricity determination period of the first working coil is set to be identical to ½ of an off-time of the second working coil, and the eccentricity determination period of the second working coil is set to be identical to ½ of an off-time of the first working coil.

* * * * *